United States Patent
Akaike et al.

(10) Patent No.: US 10,023,027 B2
(45) Date of Patent: Jul. 17, 2018

(54) WINDOW DEVICE FOR VEHICLE

(71) Applicant: TOYOTA BOSHOKU KABUSHIKI KAISHA, Aichi-ken (JP)

(72) Inventors: Fumitoshi Akaike, Aichi-ken (JP); Ryo Tamemura, Gifu-ken (JP); Mitsutaka Sakoh, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/601,133

(22) Filed: May 22, 2017

(65) Prior Publication Data

US 2017/0334269 A1 Nov. 23, 2017

(30) Foreign Application Priority Data

May 23, 2016 (JP) ................................. 2016-102377

(51) Int. Cl.
| | |
|---|---|
| *B60J 1/20* | (2006.01) |
| *E05F 15/689* | (2015.01) |
| *B60R 11/00* | (2006.01) |
| *B60R 11/02* | (2006.01) |

(52) U.S. Cl.
CPC ........... *B60J 1/2025* (2013.01); *B60J 1/2016* (2013.01); *B60J 1/2041* (2013.01); *B60J 1/2052* (2013.01); *B60J 1/2086* (2013.01); *E05F 15/689* (2015.01); *B60R 11/0235* (2013.01); *B60R 2011/0085* (2013.01)

(58) Field of Classification Search
CPC . B60J 1/20; B60J 1/2002; B60J 5/0416; B60J 5/0494; B60J 5/0404; B60J 1/2011; B60J 1/2047; B60J 1/2063

USPC ........ 296/152, 180.1, 146.6, 1.07, 163, 156, 296/159, 1.11, 154, 190.1, 70.76
See application file for complete search history.

(56) References Cited

U.S. PATENT DOCUMENTS

| | | | | |
|---|---|---|---|---|
| 6,086,133 A | * | 7/2000 | Alonso | .................. B60J 1/2019 160/23.1 |
| 6,910,518 B2 | * | 6/2005 | Zimmermann | ........ B60J 1/2019 160/370.21 |
| 7,401,840 B2 | * | 7/2008 | Schnoblen | ............. B60J 1/2044 160/370.22 |
| 9,162,553 B2 | * | 10/2015 | Benites | ...................... B60J 1/20 |
| 9,649,914 B2 | * | 5/2017 | Meier | ...................... B60J 1/203 |

FOREIGN PATENT DOCUMENTS

JP         2000-326725          11/2000

* cited by examiner

*Primary Examiner* — Darrell G Dayoan
*Assistant Examiner* — Sunsurraye Westbrook
(74) *Attorney, Agent, or Firm* — Greenblum & Bernstein, P.L.C.

(57) ABSTRACT

A window device for a vehicle, the window device including: a light-transmitting plate having light-transmitting property and fixed to a vehicle body to physically partition an exterior and an interior of the vehicle; a light-shielding body having light-shielding property and provided along the light-transmitting plate within a view of a vehicle occupant; and a moving mechanism configured to move the light-shielding body up and down so as to widen or narrow a view obtained through the light-transmitting plate above the light-shielding body.

7 Claims, 11 Drawing Sheets

| No. | DOOR TRIM 31 (LIGHT-SHIELDING BODY) | SHELL 21 (COVER BODY) | MODE |
|---|---|---|---|
| 1 | RAISED | SIDE OF FACE | RELAXATION |
| 2 | RAISED | BEHIND FACE | MONITOR VIEWING |
| 3 | NEUTRAL | SIDE OF FACE | RELAXATION BY ONESELF |
| 4 | NEUTRAL | BEHIND FACE | NORMAL |
| 5 | LOWERED | SIDE OF FACE | RELAXATION BY ONESELF |
| 6 | LOWERED | BEHIND FACE | OPEN |

WINDOW DEVICE FOR VEHICLE

CROSS-REFERENCE TO RELATED APPLICATIONS

This application claims priority from Japanese Patent Application No. 2016-102377 filed on May 23, 2016, the entire contents of which are incorporated herein by reference.

TECHNICAL FIELD

The disclosure relates to a window device installed to an opening portion of a vehicle such as an automobile, an airplane, a ship or a train.

BACKGROUND

A vehicle window is provided for seeing the external scenery or taking external light into an interior of a vehicle. Typically, a size of the vehicle window is determined in advance as necessary.

Depending on the condition of a vehicle occupant, there are cases where it is desired to keep a comfortable state without seeing the scenery. Further, there are also cases where it is desired to actively enjoy the scenery. In order to respond to such a request of an occupant, a sunshade may be additionally installed on the window (see JP-A-2000-326725).

However, the sunshade can shade the window according to personal preference but cannot increase an opening area of the window in order to enjoy a wide range of scenery.

SUMMARY

An object of the disclosure is to respond to both a request that a vehicle occupant wants to keep a comfortable state without seeing the scenery and a request that a vehicle occupant wants to enjoy the scenery more widely, by allowing an opening area of a vehicle window to be wider or narrower.

According to an aspect of the disclosure, there is provided a window device for a vehicle, the window device including: a light-transmitting plate having light-transmitting property and fixed to a vehicle body to physically partition an exterior and an interior of the vehicle; a light-shielding body having light-shielding property and provided along the light-transmitting plate within a view of a vehicle occupant; and a moving mechanism configured to move the light-shielding body up and down so as to widen or narrow a view obtained through the light-transmitting plate above the light-shielding body.

In the above-described aspect, the light-transmitting plate may be fixed to the vehicle body via a door or may be directly fixed to the vehicle body. The light-transmitting plate may be made by using a glass, an acrylic resin, and the like. The light-shielding body may be made by using an opaque glass, a colored resin, a metal plate, and the like. The light transmission amount of the light-shielding body is smaller than that of the light-transmitting plate. The light-shielding degree of the light-shielding body can be appropriately selected. The light-shielding body may be provided on either the interior of the vehicle or the exterior of the vehicle with respect to the light-transmitting plate. The up and down movement of the light-shielding body may be such that the entire light-shielding body moves up and down or may be such that an upper portion of the light-shielding body is spaced apart from the lower portion and partially moves up and down. Further, the up and down movement of the light-shielding body may be such that each part of the light-shielding body uniformly moves up and down or may be such that the range of the up and down movement is different depending on the part of the light-shielding body.

According to the above-described aspect, the light-shielding body moves up and down along the light-transmitting plate. Therefore, the view obtained above the light-shielding body through the light-transmitting plate is changed in accordance with the up and down movement of the light-shielding body. In this way, it is possible to respond to both a request for keeping a comfortable state without seeing the scenery and a request for enjoying the scenery more widely by moving the light-shielding body up and down according to the occupant's request.

DETAILED DESCRIPTION

FIGS. 1 to 6 show a first embodiment of the disclosure. The first embodiment is an example where the disclosure is applied to a front door (hereinafter, simply referred to as a "door") 1 for an automobile. In each of the figures, respective directions in the state where the door 1 is mounted on the automobile are indicated by arrows. In the following, the description relating to directions is made with reference to these directions.

Figure 1:
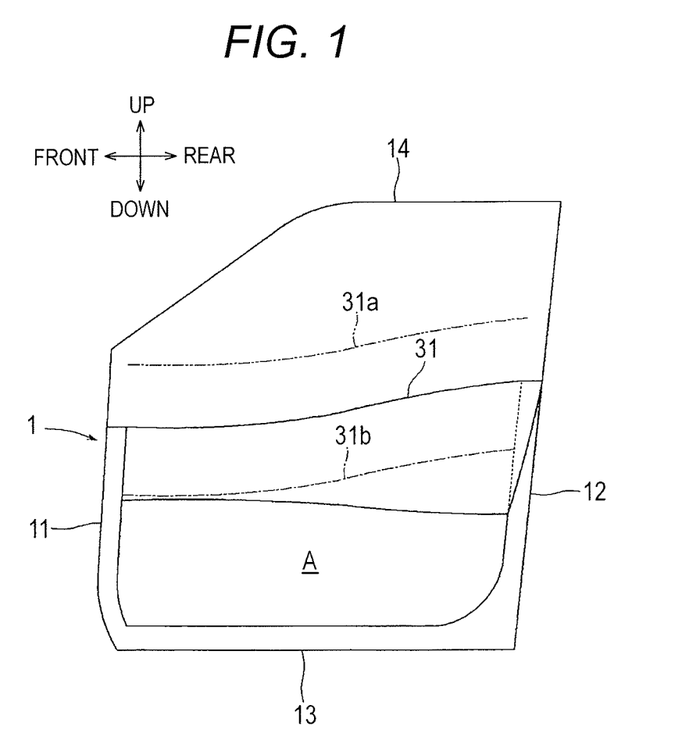
FIG. 1 is a front view of a first embodiment of the disclosure.

As shown in FIG. 1, the door 1 is a so-called sashless door and is formed by combining frames 11, 12, 13, a window glass 14 and a door trim 31. Specifically, the plate-like window glass 14 having light-transmitting property is formed in an outer shape conforming to the shape of an opening portion of a vehicle body (not shown). The frame 11 is fixed to the front side of a lower part of the window glass 14, the frame 12 is fixed to the rear side thereof, and the frame 13 is fixed to the lower side thereof. The door trim 31 has light-shielding property. The door trim 31 is disposed on the interior side of the window glass 14 and is provided between upper end portions of the frame 11 and the frame 12. Tempered glass is preferably used for the window glass 14 in order to secure strength of the door 1. Here, the description of a door lock mechanism or a hinge mechanism or the like for coupling the door 1 to a vehicle body is omitted. However, similar to the well-known door, the door is hinged to the opening portion of the vehicle body and is opened and closed. Meanwhile, the window glass 14 corresponds to the "light-transmitting plate" in the disclosure, and the door trim 31 corresponds to the "light-shielding body" in the disclosure.

The size of the door trim 31 in the up and down direction is smaller than the heights of the frame 11 and the frame 12 in the up and down direction. Therefore, a lower end of the door trim 31 is normally spaced apart from the frame 13. In this way, a region "A" interposed between the lower end of the door trim 31 and the frame 13 is not covered with the door trim 31, and thus, the window glass 14 is exposed. Since the window glass 14 has light-transmitting property, in the region "A," the exterior can be seen from the interior, and the interior can be seen from the exterior. When such a viewing situation is not desirable, the portion of the window glass 14 corresponding to the region "A" can be colored to be less visible or a curtain or a shielding curtain can be installed to the portion.

Figure 6:
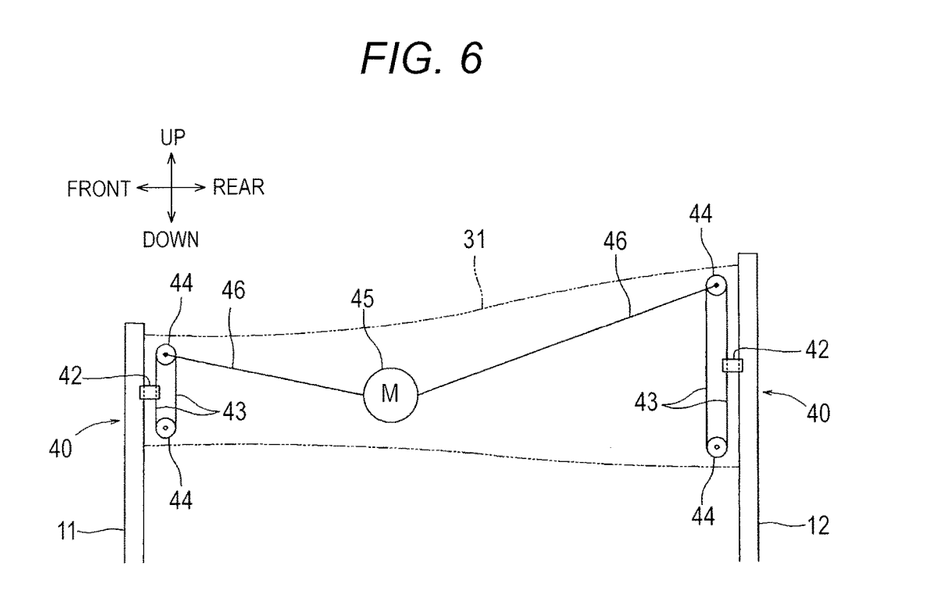
FIG. 6 is a schematic configuration view of a moving mechanism according to the first embodiment.

The door trim 31 is movable up and down by sliding along a longitudinal direction of the frame 11 and the frame 12. A moving mechanism 40 for this purpose is shown in FIG. 6. The moving mechanism 40 is provided between the door trim 31 and the window glass 14. On the side of the window glass 14 at the front and rear ends of the door trim 31, a drive belt 43 is wound around a pair of pulleys 44, respectively. Each pair of pulleys 44 is rotatably supported on the door trim 31, respectively, and is disposed apart from each other in the up and down direction. Each drive belt 43 is configured to move up and down when each pair of pulleys 44 is rotated. A moving body 42 is coupled to the outside of each drive belt 43 in a front and rear direction, respectively. Each moving body 42 is also coupled to the frames 11, 12, respectively. A driving force of a motor 45 is transmitted to an upper one of the respective pulleys 44 via a cable 46. Therefore, when the pulleys 44 are rotated by the motor 45, a force for moving each moving body 42 in the up and down direction is applied via each drive belt 43. However, each moving body 42 cannot move because it is respectively coupled to the frames 11, 12. Therefore, the door trim 31 to which each pulley 44 is fixed is moved in the up and down direction by a reaction force.

Figure 2:
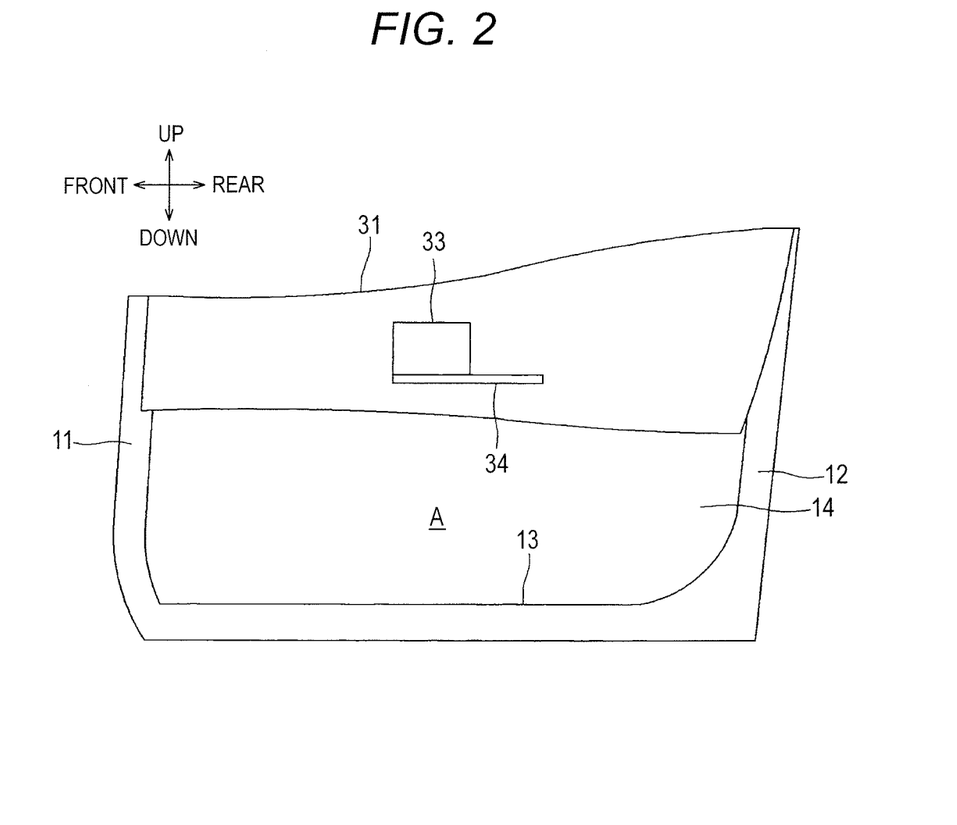
FIG. 2 is a front view showing a state where a light-shielding body is in a neutral position according to the first embodiment.
Figure 3:
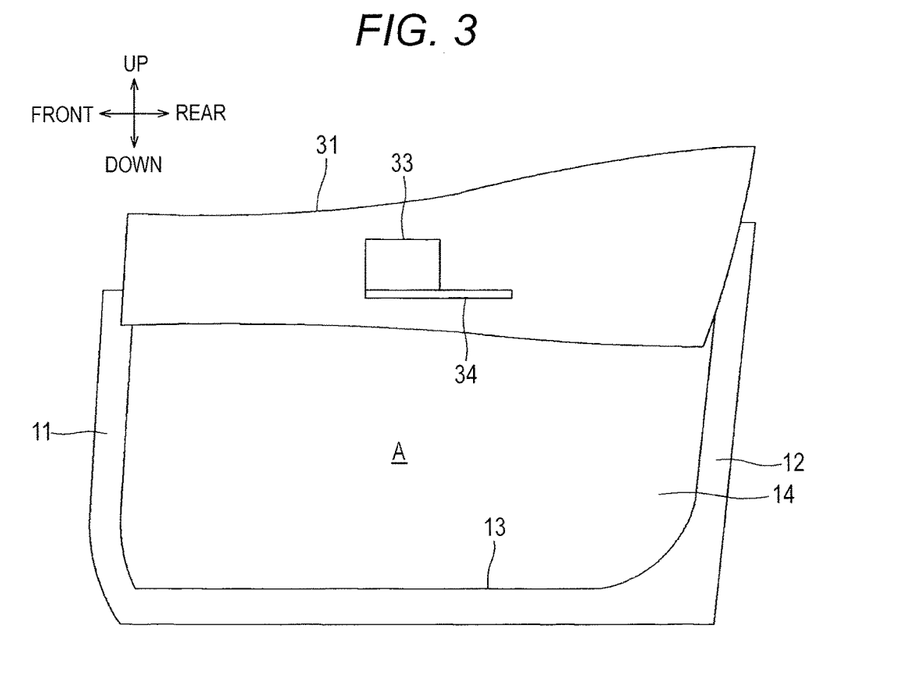
FIG. 3 is a front view showing a state where the light-shielding body is in a raised position according to the first embodiment.
Figure 4:
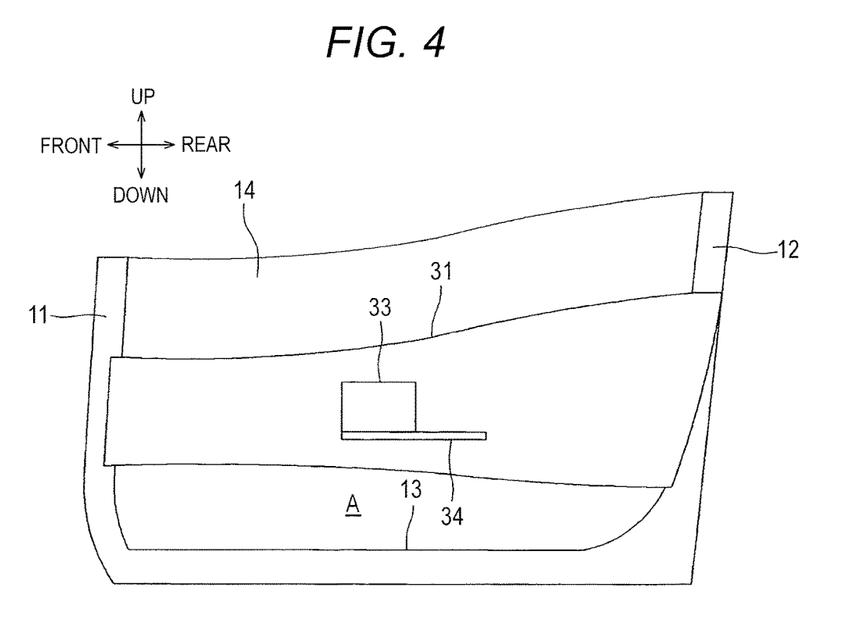
FIG. 4 is a front view showing a state where the light-shielding body is in a lowered position according to the first embodiment.

In FIG. 1, a reference numeral "31a" indicates the position of an upper end edge of the door trim 31 when the door trim 31 is in an upper limit position, and a reference numeral "31b" indicates the position of the upper end edge of the door trim 31 when the door trim 31 is in a lower limit position. Further, FIG. 2 shows a state in which the door trim 31 is in a neutral position where it has not been moved up and down. FIG. 3 shows a state in which the door trim 31 is in the upper limit position. FIG. 4 shows a state in which the door trim 31 is in the lower limit position.

Figure 5:
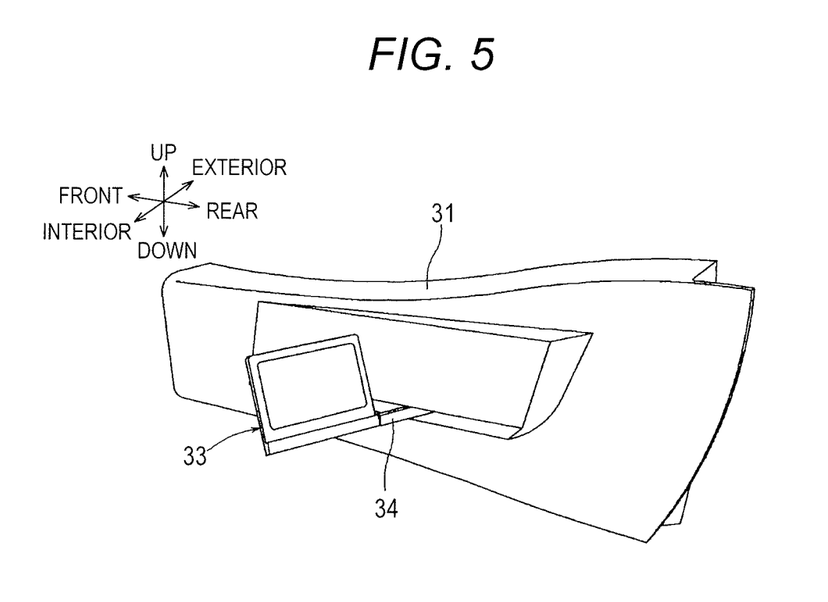
FIG. 5 is a perspective view showing a state where a monitor in the light-shielding body of the first embodiment is set as a viewing position.

As shown in FIGS. 2 to 4, a liquid crystal display type monitor 33 is provided at a central portion on the interior side of the door trim 31. The monitor 33 is movable between an accommodation position and a usage position. FIGS. 2 to 4 show a state in which the monitor 33 is in the accommodation position, and FIG. 5 shows a state in which the monitor 33 is in the usage position. In the accommodation position, the monitor 33 is disposed so that its liquid crystal display screen faces the interior side. Further, in the usage position, the monitor 33 is disposed so that its liquid crystal display screen faces rearward. As shown in FIG. 5, a support arm 34 is provided at a lower end portion of the monitor 33. An end portion of the support arm 34 is rotatably supported within the door trim 31. Therefore, when the monitor 33 is moved from the accommodation position to the usage position, the monitor 33 is rotated around the end portion of the support arm 34. The movement of the monitor 33 between the accommodation position and the usage position may be manually performed or may be electrically performed. Although the liquid crystal display type monitor 33 is used herein, various known types of display devices may be used. Here, the monitor 33 corresponds to the "display device" in the disclosure.

When the monitor 33 is set to the usage position in a state where the door trim 31 is located at the upper limit position as shown in FIG. 3, the monitor 33 is located at a position that can be easily viewed by an occupant seated on a seat installed on the interior side of the door 1. Therefore, the monitor 33 is optimal as a display device for displaying an image when an occupant seated on a seat enjoys entertainment. In related art, it has been proposed to support a similar monitor on a seat. However, in this case, in order to move the monitor supported on the seat to the usage position or the accommodation position, a relatively long arm is required. On the contrary, since the monitor 33 of the present embodiment is supported on the door trim 31 moving up and down, the support arm 34 for moving, the monitor 33 between the accommodation position and the usage position can be relatively short.

Figure 7:
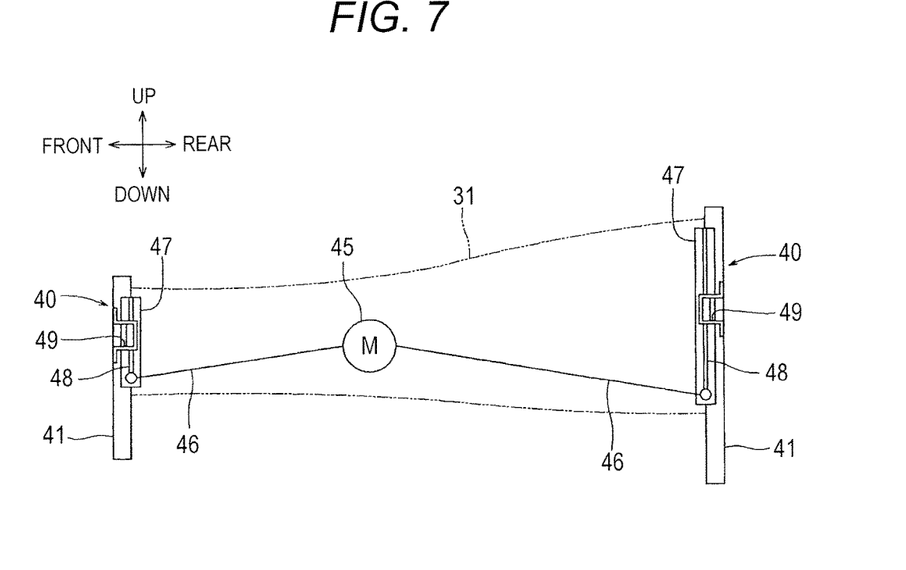
FIG. 7 is a schematic configuration view of a modified embodiment of the moving mechanism according to the first embodiment.

FIG. 7 shows a modified embodiment of the moving mechanism 40 shown in FIG. 6. In this modified embodiment, a movable rail 47 is slidably engaged with each fixed rail 41 fixed to the frames 11, 12, respectively. Each movable rail 47 is fixed to front and rear ends of the door trim 31, respectively. Meanwhile, each movable rail 47 rotatably incorporates a feed screw 48 along its longitudinal direction, respectively. Each feed screw 48 is rotatable by the motor 45 via each cable 46. Further, a nut assembly 49 is fixed to each fixed rail 41, respectively. Each nut assembly 49 is provided with a nut (not shown). The nut is fixed to each nut assembly 49 so as not to rotate, and is screwed to each feed screw 48. Therefore, when each feed screw 48 is rotated by the motor 45, each feed screw 48 is moved in the up and down direction with respect to each nut assembly 49. In this way, the door trim 31, to which each feed screw 48 is fixed, is moved up and down.

In this modified embodiment, each feed screw 48 is rotatably incorporated in each movable rail 47 and each nut assembly 49 is fixed to each fixed rail 41. However, the relationship between the rotation and fixation may be reversed. That is, each nut assembly 49 rotated by the motor 45 may be fixed to each movable rail 47, and each feed screw 48 may be non-rotatably fixed to each fixed rail 41. Here, the movable rails 47 correspond to the "sliding body" in the disclosure.

Figure 8:
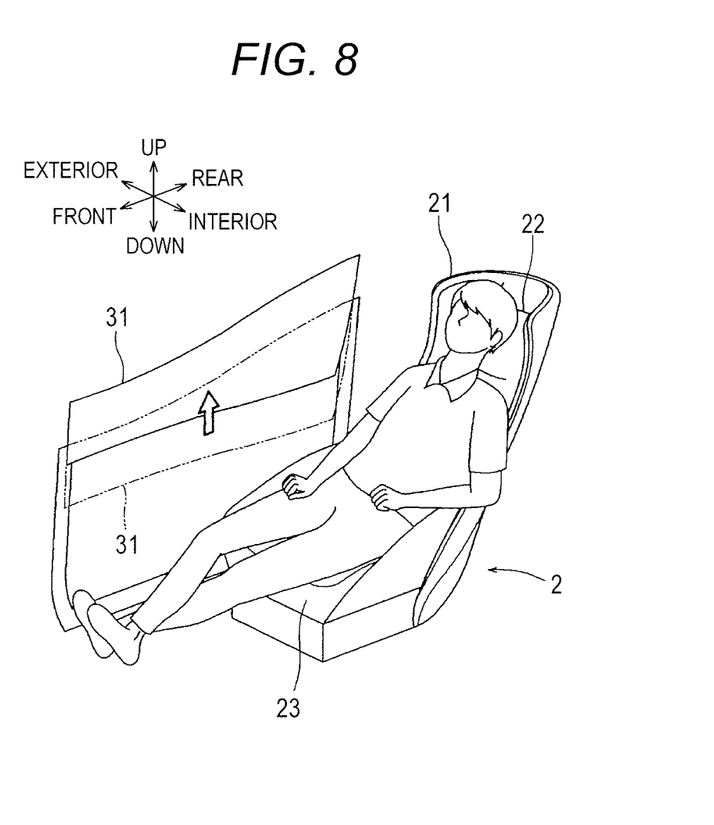
FIG. 8 is an explanatory view showing one usage mode of the first embodiment.
Figure 9:
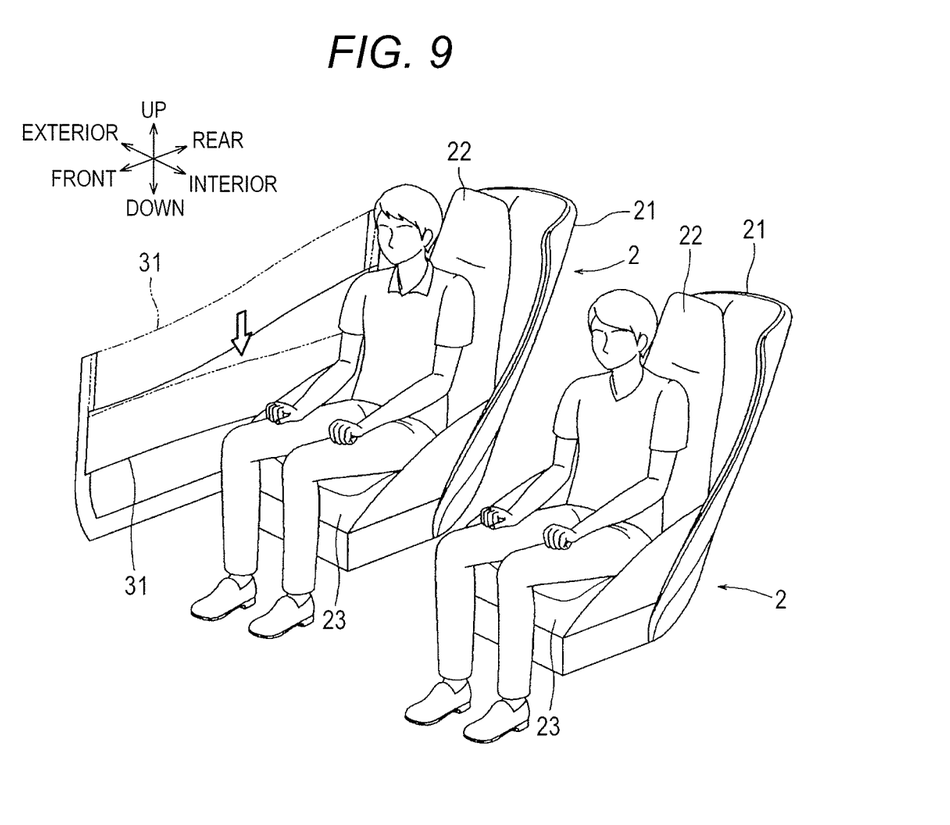
FIG. 9 is an explanatory view showing another usage mode of the first embodiment.

FIGS. 8 and 9 show the relationship between the up and down movement of the door trim 31 and the seat 2 provided adjacent thereto. The seat 2 is provided with a shell 21 so as to cover the rear side of a seat back 22. The seat back 22 is rotatable in the front and rear direction with respect to a seat cushion 23 and is moved relative to the shell 21. When the seat back 22 is rotated toward the shell 21, the seat back 22 is accommodated in the shell 21. FIG. 8 shows a state in which the seat back 22 is accommodated in the shell 21 and in which an occupant's head is covered at its side with a sidewall of the shell 21. At this time, the door trim 31 is moved from the neutral position to the upper limit position. On the other hand, FIG. 9 shows a state in which the seat back 22 is spaced apart from the shell 21 and is erected at a normal seating position and in which an occupant's head is not covered at its side with the sidewall of the shell 21. At this time, the door trim 31 is moved from the neutral position to the lower limit position. Here, the sidewall of the shell 21 corresponds to the "cover body" in the disclosure.

Figure 10:
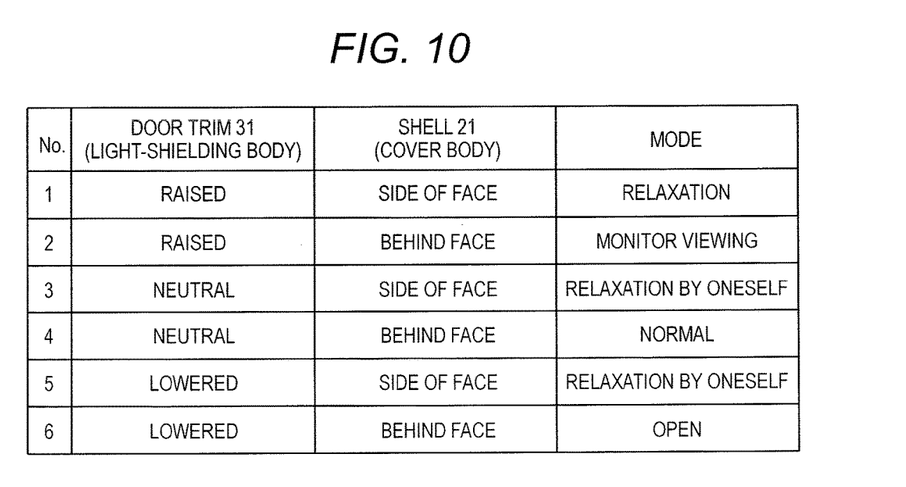
FIG. 10 is a table showing contents of a related control of the light-shielding body and a cover body according to the first embodiment.
Figure 11:
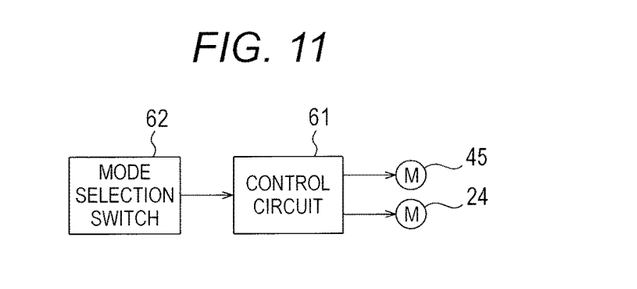
FIG. 11 is a block diagram of an electrical circuit for implementing the control shown in FIG. 10.

FIG. 10 shows a positional relationship between the door trim 31 and the shell 21 for each mode desired by an occupant seated on the seat 2. FIG. 11 shows an electric circuit for moving the door trim 31 and the shell 21 with respect to each mode desired by the occupant. A control circuit 61 in FIG. 11 includes a microcomputer and operates the motors 45, 24 so as to implement a mode selected by a mode selection switch 62. The mode selected by the mode selection switch 62 includes six modes shown in FIG. 10. When one of these modes is selected, the motors 45, 24 are operated so as to implement the aspects of the door trim 31 and the shell 21 shown in FIG. 10.

As indicated by No. 1 in FIG. 10, when a "relaxation mode" is desired, the door trim 31 is raised to the upper limit position, and the seat back 22 is tilted rearward so that the shell 21 is positioned at the side of an occupant's face. That is, the state shown in FIG. 8 is set. To this end, the mode selection switch 62 is operated to actuate the motors 45, 24 by the control circuit 61. Here, the motor 24 operates the seat back 22 to be tilted rearward. In the "relaxation mode," the door trim 31 is raised to the upper limit position. Therefore, the door trim 31 hinders the view of the occupant. In addition, since the seat back 22 is tilted rearward, the side view of the occupant is also hindered by the shell 21. In this way, the occupant can relax in a comfortable posture.

As indicated by No. 2 in FIG. 10, when a "monitor viewing mode" is desired, the door trim 31 is raised to the upper limit position, and the seat back 22 is tilted forward so that the shell 21 is positioned behind an occupant's face. To this end, the mode selection switch 62 is operated to actuate the motors 45, 24 by the control circuit 61. The motor 24 operates the seat back 22 to be spaced apart from the shell 21 and to be tilted forward. In the "monitor viewing mode," the door trim 31 is raised to the upper limit position. Therefore, the door trim 31 hinders the view of the occupant. In addition, in the "monitor viewing mode," since the seat back 22 is erected to be in a normal seating position, the shell 21 does not hinder the side view of the occupant. Therefore, the occupant can move the monitor 33 to the usage position and view the monitor 33. In this "monitor viewing mode," the lower side of the door trim 31 is largely opened. Therefore, it is possible to check and enjoy the scenery at the lower position outside the vehicle through the portion of the window glass 14 located below the door trim 31. In this case, it is necessary that the monitor 33 is kept in the accommodation position and the portion of the window glass 14 located below the door trim 31 has light-transmitting property. Meanwhile, when the "monitor viewing mode" is selected, the monitor 33 may be automatically moved from the accommodation position to the usage position.

As indicated by Nos. 3 and 5 in FIG. 10, when a "relaxation by oneself mode" is desired, the door trim 31 is lowered to the neutral position or the lower limit position, and the seat back 22 is tilted rearward so that the shell 21 is positioned at the side of the occupant's face. To this end, the mode selection switch 62 is operated to actuate the motors 45, 24 by the control circuit 61. In the "relaxation by oneself mode," the door trim 31 is lowered to the neutral position or the lower limit position. Therefore, the door trim 31 does not hinder the view of the occupant. However, the seat back 22 is tilted rearward and hinders the side view of the occupant. Therefore, the occupant seated on the seat 2 adjacent to the door trim 31 can relax in a comfortable posture. On the other hand, the occupants seated on the other seats can enjoy the scenery outside the vehicle through the portion of the window glass 14 located above the door trim 31. That is, with the presence of the "relaxation by oneself mode," each occupant can spend their time in the vehicle according to their preference.

As indicated by No. 4 in FIG. 10, when a "normal mode" is desired, the door trim 31 is set to the neutral position, and the seat back 22 is tilted forward so that the shell 21 is positioned behind an occupant's face. To this end, the mode selection switch 62 is operated to actuate the motors 45, 24 by the control circuit 61. In the "normal mode," the door trim 31 is located at the normal position and does not hinder the view of an occupant. Therefore, the normal view is obtained through the window glass 14, and thus, an occupant is in a normal state.

As indicated by No. 6 in FIG. 10, when an "open mode" is desired, the door trim 31 is lowered to the lower limit position, and the seat back 22 is tilted forward so that the shell 21 is positioned behind an occupant's face. That is, the state shown in FIG. 9 is set. To this end, the mode selection switch 62 is operated to actuate the motors 45, 24 by the control circuit 61. In the "open mode," the door trim 31 is lowered to the lower limit position and the upper side of the door trim 31 is largely opened. In addition, since the seat back 22 is erected to be in the normal seating position, the shell 21 does not hinder the side view of the occupant. Therefore, the occupant can enjoy the scenery outside the vehicle through the window glass 14 largely opened above the door trim 31. Moreover, the occupant can enjoy the sense of openness.

By thus controlling the door trim 31 and the seat back 22 of the seat 2 in relation to each other, the up and down movement of the door trim 31 and the position of the shell 21 can be appropriately adjusted in accordance with the preference of an occupant seated on the seat 2 adjacent to the door trim 31 and the preference of an occupant riding together with the occupant.

Figure 12:
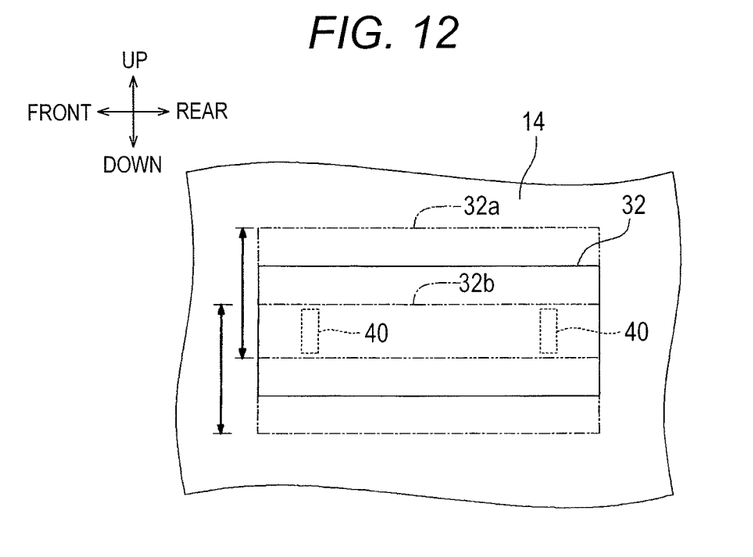
FIG. 12 is a front view of a second embodiment of the disclosure.

FIG. 12 shows a second embodiment of the disclosure. The second embodiment is different from the first embodiment especially in that a door trim 32 is fixed in a floating island shape with respect to the window glass 14 fitted to the opening portion of the vehicle body. Similar to the door trim 31 in the first embodiment, the door trim 32 is movable up and down with respect to the window glass 14. In FIG. 12, a reference numeral "32a" represents a state in which the door trim 32 is in the upper limit position, and a reference numeral "32b" represents a state in which the door trim 32 is in the lower limit position. The arrows in FIG. 12 respectively indicate a width of the door trim 32 in the up and down direction when the door trim 32 is in the upper limit position and the lower limit position. In the second embodiment, the moving mechanism 40 is provided within a range where the two arrows overlap. Therefore, the moving mechanism 40 is not exposed to a position which can be viewed by the occupant even when the door trim 32 is moved up and down. In order to prevent the moving mechanism 40 from being viewed from the outside of the window glass 14, it is preferable to perform a non-transparency processing such as coloring the portion of the window glass 14 on which the moving mechanism 40 is provided, in terms of good appearance.

The moving mechanism 40 is configured similarly to the moving mechanism 40 shown in FIG. 6 or 7. Here, in the moving mechanism 40 shown in FIG. 6, the moving body 42 corresponds to the "first member" of the disclosure, and a pair of pulleys 44 and the drive belt 43 correspond to the "second member" in the disclosure. Further, in the moving mechanism 40 shown in FIG. 7, the fixed rail 41 and the nut assembly 49 correspond to the "first member" in the disclosure, and the movable rail 47 and the feed screw 48 correspond to the "second member" of the disclosure.

According to the second embodiment, the door trim 32 is provided in a floating island shape with respect to the window glass 14. Therefore, it is possible to provide a window device of an innovative design.

Figure 13:
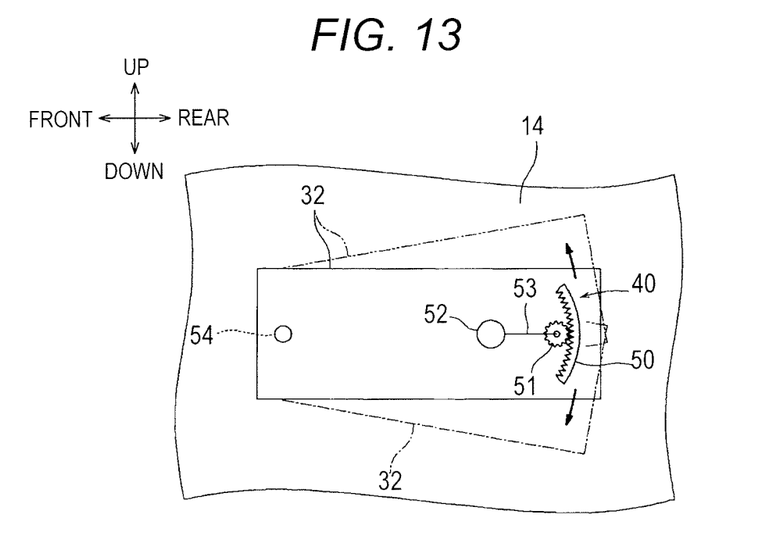
FIG. 13 is a schematic configuration view of a modified embodiment of a moving mechanism according to the second embodiment.

FIG. 13 shows a modified embodiment of the moving mechanism 40 in the second embodiment. The moving mechanism 40 according to this modified embodiment is configured such that the door trim 32 moves up and down by rotating around one side with respect to the window glass 14. Specifically, a front end portion of the door trim 32 is supported on the window glass 14 by a hinge pin 54, so that the door trim 32 can be rotated in the up and down direction. Further, at a rear end portion of the door trim 32, a rack bar 50 is fixed along a circular arc centered on the hinge pin 54. A gear is formed on the portion of the rack bar 50 inside the circular arc, and a pinion gear 51 is meshed with the gear. The pinion gear 51 is fixed to the side of the window glass 14 and is rotationally driven by the motor 52 via a connecting rod 53.

When the pinion gear 51 is rotationally driven by the motor 52, the rack bar 50 moves up and down according to the rotation direction of the motor 52. Therefore, as indicated by an arrow, the rear end portion of the door trim 32 is rotated, together with the rack bar 50, around the hinge pin 54, so that the door trim 32 moves up and down. In this case, the hinge pin 54 is provided at the front end portion of the door trim 32, and the rack bar 50 and the pinion 51 are provided at the rear end portion of the door trim 32. However, these may be reversed. That is, the hinge pin 54 may be provided at the rear end portion of the door trim 32, and the rack bar 50 and the pinion gear 51 may be provided at the front end portion of the door trim 32. Further, by using the moving mechanism 40 having the same configuration as in FIGS. 6 and 7, the door trim 32 can be moved up and down while being inclined in the front and rear direction, similar to the modified embodiment shown in FIG. 13. In this case, such movement can be realized by respectively providing the moving mechanism 40 having the same configuration as in FIGS. 6 and 7 at the position of the hinge pin 54 and the positions of the rack bar 50 and the pinion gear 51 and giving a difference in the amounts of movement of the moving mechanism 40 in the front and rear direction.

According to such a modified embodiment, the up and down movement of the door trim 32 can be performed differently from the second embodiment shown in FIG. 12, thereby providing a window device of a more innovative design.

Although specific embodiments have been described above, the disclosure is not limited to these appearances and configurations, and various modifications, additions and deletions can be made without changing the spirit of the disclosure. For example, although the disclosure has been applied to the window device of the automobile in the above embodiments, the disclosure can be also applied to a window device mounted on an airplane, a ship, a train, and the like.

The disclosure provides illustrative, non-limiting examples as follows:

According to a first aspect, there is provided a window device for a vehicle, the window device including: a light-transmitting plate having light-transmitting property and fixed to a vehicle body to physically partition an exterior and an interior of the vehicle; a light-shielding body having light-shielding property and provided along the light-transmitting plate within a view of a vehicle occupant; and a moving mechanism configured to move the light-shielding body up and down so as to widen or narrow a view obtained through the light-transmitting plate above the light-shielding body.

In the first aspect, the light-transmitting plate may be fixed to the vehicle body via a door or may be directly fixed to the vehicle body. The light-transmitting plate may be made by using a glass, an acrylic resin, and the like. The light-shielding body may be made by using an opaque glass, a colored resin, a metal plate, and the like. The light transmission amount of the light-shielding body is smaller than that of the light-transmitting plate. The light-shielding degree of the light-shielding body can be appropriately selected. The light-shielding body may be provided on either the interior of the vehicle or the exterior of the vehicle with respect to the light-transmitting plate. The up and down movement of the light-shielding body may be such that the entire light-shielding body moves up and down or may be such that an upper portion of the light-shielding body is spaced apart from the lower portion and partially moves up and down. Further, the up and down movement of the light-shielding body may be such that each part of the light-shielding body uniformly moves up and down or may be such that the range of the up and down movement is different depending on the part of the light-shielding body.

According to the first aspect, the light-shielding body moves up and down along the light-transmitting plate. Therefore, the view obtained above the light-shielding body through the light-transmitting plate is changed in accordance with the up and down movement of the light-shielding body. In this way, it is possible to respond to both a request for keeping a comfortable state without seeing the scenery and a request for enjoying the scenery more widely by moving the light-shielding body up and down according to the occupant's request.

According to a second aspect, there is provided the window device for the vehicle according to the first aspect, wherein, when the light-shielding body is moved upward, a lower end of the light-shielding body is spaced apart from the vehicle body and external light enters the interior of the vehicle through the light-transmitting body below the light-shielding body.

According to the second aspect, when the light-shielding body is moved upward, external light enters the interior of the vehicle from below the light-shielding body. Therefore, even when the light-shielding body is moved upward and thus the comfortable state is set, it is possible to suppress the interior of the vehicle from becoming too dark. Further, as the lower part of the interior of the vehicle is opened, it is possible to enjoy the sense of openness. Furthermore, when it is desired to see the scenery at a lower position at the exterior of the vehicle, it is also possible to check and enjoy the scenery from below the light-shielding body by moving the light-shielding body upward.

According to a third aspect, there is provided the window device for the vehicle according to the first or second aspect, wherein the moving mechanism includes a first member and a second member relatively moving up and down and is interposed between the light-transmitting plate and the light-shielding body, wherein the first member is fixed to the light-transmitting plate and the second member is fixed to the light-shielding body, and wherein the first member is disposed within a region where the light-shielding body at an upper limit position and the light-shielding body at a lower limit position overlap with each other.

According to the third aspect, among the first member and the second member of the moving mechanism relatively moving up and down, the first member fixed to the light-transmitting plate is normally disposed at a position hidden by the light-shielding body during the movement of the light-shielding body. Therefore, the moving mechanism is not provided at a position exposed from the light-shielding body, and the light-shielding body can be arranged in a floating island shape with respect to the light-transmitting plate. As a result, it is possible to provide a window device of an innovative design.

According to a fourth aspect, there is provided the window device for the vehicle according to any one of the first to third aspects, wherein the light-shielding body is disposed on the interior side of the vehicle with respect to the light-transmitting plate, and wherein the light-shielding body is provided with a display device which is configured to provide information to the vehicle occupant.

According to the fourth aspect, the light-shielding body is provided with the display device. Therefore, when an occupant moves the light-shielding body upward and thus a comfortable state is set, the display device is located at a position which can be easily viewed by an occupant, so that the occupant can check and enjoy the information displayed on the display device. In related art, in the case of fixing a display device to a seat, it is necessary to fix the display device on a relatively long arm in order to arrange the display device at a position which can be easily viewed by the occupant. According to the fourth aspect, in the comfortable state where the light-shielding body is moved upward, the display device is located at the position which can be easily viewed by an occupant. Therefore, it is not necessary to fix the display device on a long arm.

According to a fifth aspect, there is provided the window device for the vehicle according to any one of the first to fourth aspects, wherein a cover body which is configured to suppress light from reaching the seated occupant through the light-transmitting plate is provided to a seat which is adjacent to the light-shielding body and on which the vehicle occupant is seated, and wherein, in relation to the up and down movement of the light-shielding body, the cover body is moved between a position at which the cover body suppresses light from reaching the seated occupant and a position at which the cover body does not suppress light from reaching the seated occupant.

In the fifth aspect, the cover body may be made by using an opaque glass, a colored resin, a metal plate, and the like. The light transmission amount of the cover body is smaller than that of the light-transmitting plate. The extent of incoming light suppression by the cover body can be appropriately selected.

According to the fifth aspect, the up and down movement of the light-shielding body and the position of the cover body can be appropriately adjusted in accordance with the preference of an occupant seated on the seat adjacent to the light-shielding body and the preference of an occupant riding together with the occupant.

According to a sixth aspect, there is provided the window device for the vehicle according to any one of the first to fifth aspects, wherein the moving mechanism includes a fixed rail and a sliding body configured to slide relative to the fixed rail, and wherein the fixed rail is fixed to the light-transmitting plate or the vehicle body and the sliding body is fixed to the light-shielding body.

In the sixth aspect, the combination of the fixed rail and the sliding body may be one set or a plurality of sets.

According to the sixth aspect, as the sliding body is slid along the fixed rail, the light-shielding body is moved up and down. Therefore, the up and down movement of the light-shielding body can be stably performed. Moreover, the light-shielding body may be set to move in various ways other than simple up and down movement, depending on the setting shape and length of the fixed rail.

According to a seventh aspect, there is provided the window device for the vehicle according to any one of the first to sixth aspects, wherein, when the light-shielding body is located at a lower limit position, an upper end edge of the light-shielding body is located lower than an upper end edge of the light-transmitting plate and a lower end edge of the light-shielding body is located upper than a lower end edge of the light-transmitting plate.

According to an eighth aspect, there is provided the window device for the vehicle according to any one of the first to seventh aspects, wherein the size of the light-shielding body is smaller than a size of the light-transmitting plate.

What is claimed is:
1. A window device for a vehicle, the window device comprising:
 a light-transmitting plate having light-transmitting property and fixed to a vehicle body to physically partition an exterior and an interior of the vehicle;
 a light-shielding body having light-shielding property and provided along the light-transmitting plate within a view of a vehicle occupant; and
 a moving mechanism configured to move the light-shielding body up and down so as to widen or narrow a view obtained through the light-transmitting plate above the light-shielding body,
 wherein, when the light-shielding body is moved upward, a lower end of the light-shielding body is spaced apart from the vehicle body and external light enters the interior of the vehicle through the light-transmitting body below the light-shielding body.
2. The window device for the vehicle according to claim 1,
 wherein the moving mechanism includes a first member and a second member relatively moving up and down and is interposed between the light-transmitting plate and the light-shielding body,
 wherein the first member is fixed to the light-transmitting plate and the second member is fixed to the light-shielding body, and
 wherein the first member is disposed within a region where the light-shielding body at an upper limit position and the light-shielding body at a lower limit position overlap with each other.
3. The window device for the vehicle according to claim 1, wherein the light-shielding body is disposed on the interior side of the vehicle with respect to the light-transmitting plate, and wherein the light-shielding body is provided with a display device which is configured to provide information to the vehicle occupant.

4. The window device for the vehicle according to claim 1, wherein a cover body which is configured to suppress light from reaching the seated occupant through the light-transmitting plate is provided to a seat which is adjacent to the light-shielding body and on which the vehicle occupant is seated, and wherein, in relation to the up and down movement of the light-shielding body, the cover body is moved between a position at which the cover body suppresses light from reaching the seated occupant and a position at which the cover body does not suppress light from reaching the seated occupant.

5. The window device for the vehicle according to claim 1, wherein the moving mechanism includes a fixed rail and a sliding body configured to slide relative to the fixed rail, and wherein the fixed rail is fixed to the light-transmitting plate or the vehicle body and the sliding body is fixed to the light-shielding body.

6. The window device for the vehicle according to claim 1, wherein, when the light-shielding body is located at a lower limit position, an upper end edge of the light-shielding body is located lower than an upper end edge of the light-transmitting plate and a lower end edge of the light-shielding body is located upper than a lower end edge of the light-transmitting plate.

7. The window device for the vehicle according to claim 1, wherein the size of the light-shielding body is smaller than a size of the light-transmitting plate.

* * * * *